July 9, 1940.  E. W. CHAFEE ET AL  2,206,875
FIRE CONTROL DEVICE
Original Filed April 21, 1936  3 Sheets—Sheet 1
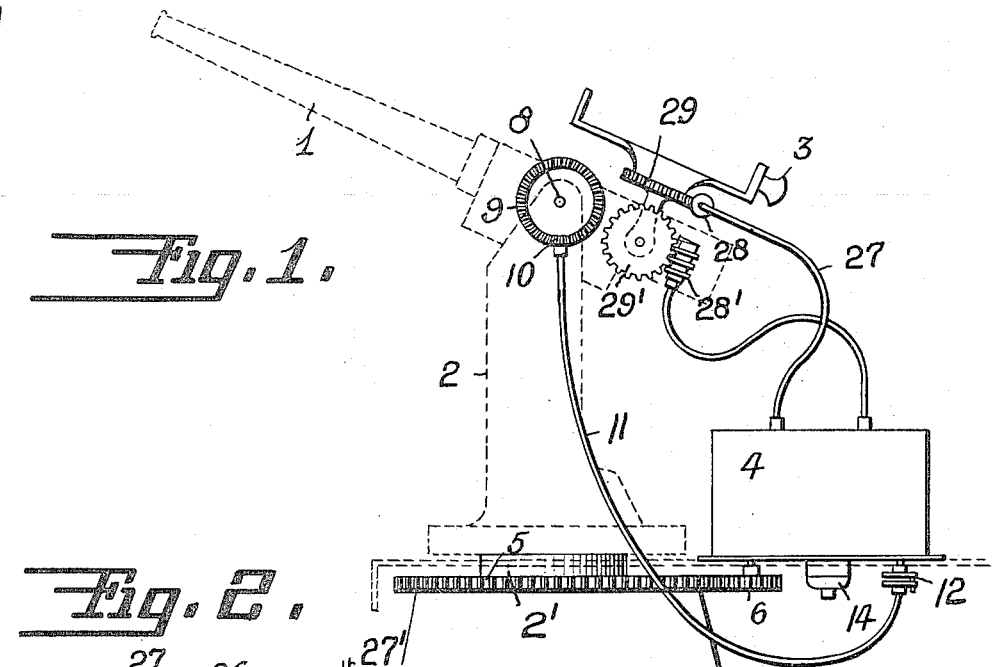
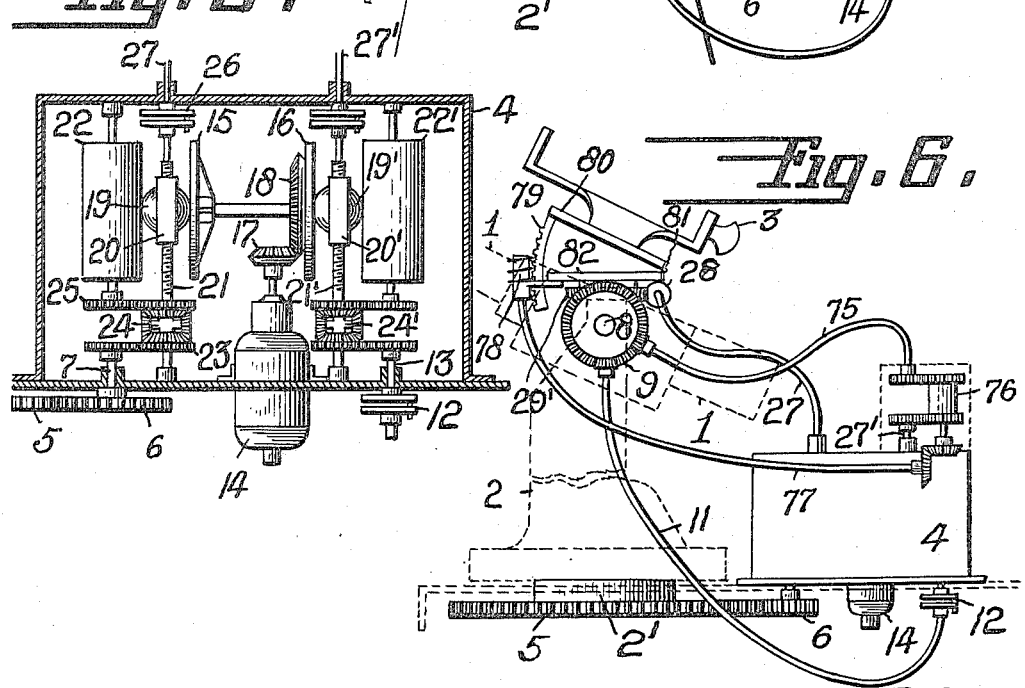
INVENTORS
Earl W. Chafee
Bruno A. Wittkuhns
BY
Herbert H. Thompson
THEIR ATTORNEY

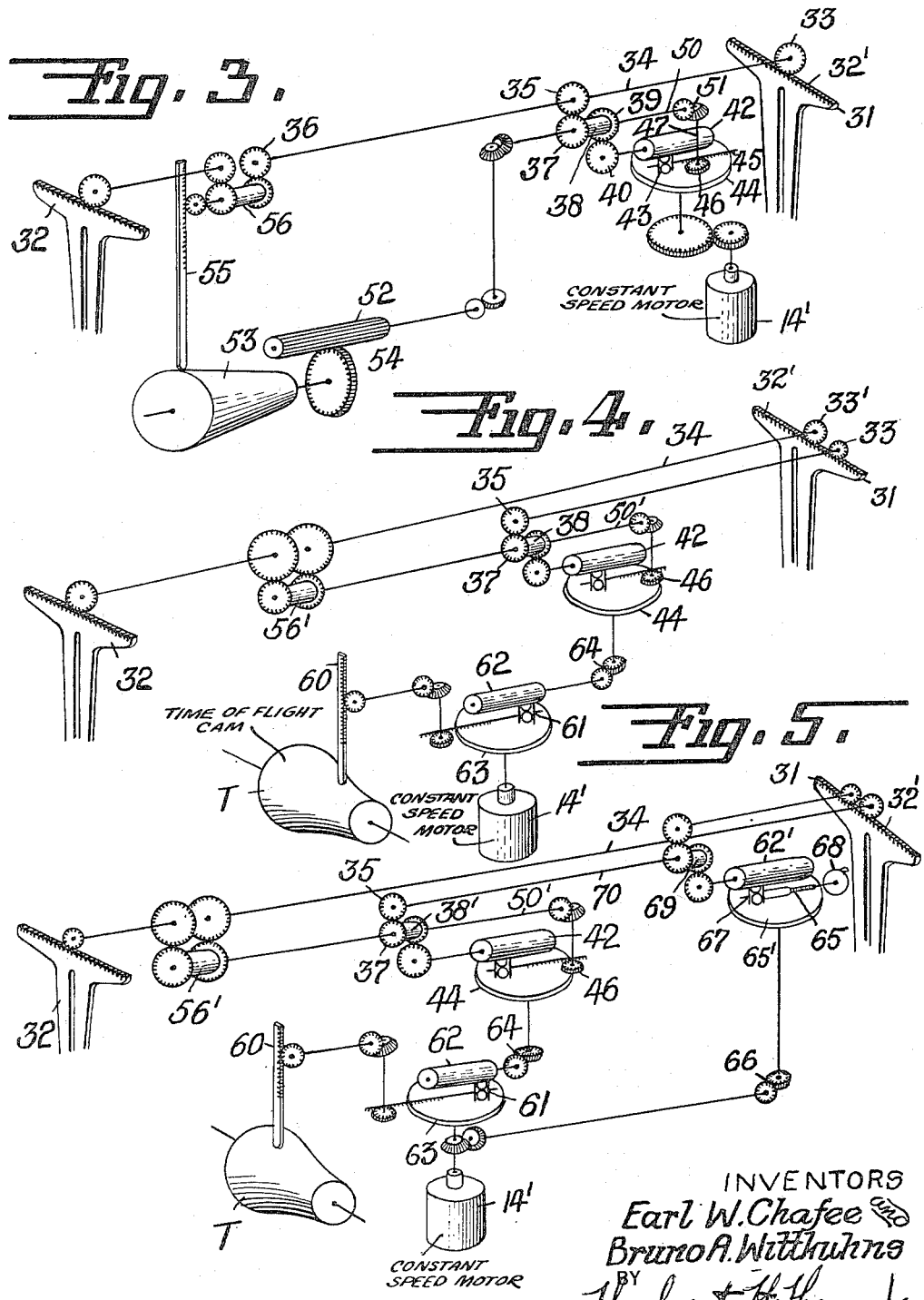

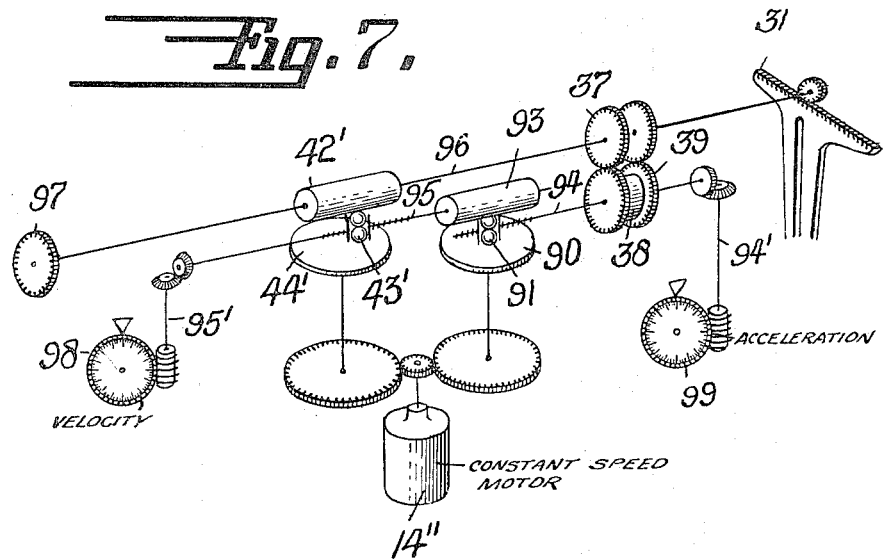

Patented July 9, 1940

2,206,875

UNITED STATES PATENT OFFICE 2,206,875

FIRE CONTROL DEVICE

Earl W. Chafee, New York, N. Y., and Bruno A. Wittkuhns, Summit, N. J., assignors to Sperry Gyroscope Company, Inc., Brooklyn, N. Y., a corporation of New York Application April 21, 1936, Serial No. 75,526
Renewed September 30, 1939

5 Claims. (Cl. 33—49)

This invention relates to fire control devices to aid in the laying of guns, especially of the anti-aircraft type, wherein the relative speed of the target is great. In such devices the rate of movement of the target, either angular or linear, is the principal element of the mechanism, since the difference between the present and predicted bearings is a primary function of the rate of the target movement.

According to the present practice, this rate of movement is measured by some speed measuring device, such as a tachometer or variable speed mechanism, and then the measured rate is set into the machine by a power multiplying device, such as a follow-the-pointer indicator in which the power is supplied manually, or a motor driven follow-up device employing contacts on an indicator to actuate the motor. The first of said devices involves the employment of one man to match the indicator and is subject to lag, which becomes serious in the short ranges against aircraft, especially where one aircraft is shooting at another aircraft.

According to the present invention, we propose to eliminate the aforesaid step of measuring the rate and then setting the same into the machine by a follow-up or other device. According to our present invention, we employ a mechanism by which the rate is determined as a mechanical displacement or movement which possesses sufficient power to be introduced directly into the machine. With such a device we may displace the gun relatively to the sight directly, since ample power is available for such purposes.

Other objects of the invention will be apparent from the following description.

Referring to the drawings, illustrating several forms our invention may assume,

Fig. 1 shows our invention as applied to a hand operated short range gun, such as a machine gun adapted for use on an aircraft against another plane or near objects on the ground.

Fig. 2 is a vertical section through the casing of the power driven rate means.

Fig. 3 is a diagrammatic view showing our invention applied in one manner to a predictor mechanism to eliminate the rate measuring devices of the prior art.

Fig. 4 shows how our invention may also be used to secure automatically, without the use of a rate by time multiplying cam or linkage, the target displacement during the time of flight of the shell by multiplying the rate by time in a new manner.

Fig. 5 illustrates a still further development showing how the wind correction may be introduced into this type of mechanism.

Fig. 6 shows a slight modification of the form of the invention shown in Fig. 1.

Fig. 7 shows a further modification wherein both velocity and acceleration are derived.

Referring first to Figs. 1 and 2, the numeral 1 represents some form of quick firing, relatively short range gun mounted for rotation in azimuth and for tilting in elevation. As shown, the gun is pivoted on truunion axis 8 on pedestal 2, which is rotatable in azimuth on base 2'. On said gun is mounted any suitable form of sight 3 which is preferably rotatably and tiltably mounted on the gun barrel. The movements of the gun in azimuth are transmitted to the rate mechanism enclosed within box 4, by means of a large gear 5 which rotates with the pedestal 2 and which drives a pinion 6 on shaft 7, journaled in the box 4. Similarly, elevation movements of the gun about trunnion axis 8 are transmitted to the box 4, as by means of a bevel gear 9, bevel pinion 10, flexible shaft 11, universal joint 12 and shaft 13.

In said box is mounted a motor 14 which rotates, preferably at a constant speed, the friction discs 15 and 16 through bevel gearing 17 and 18. On each of said discs rests a ball 19 which is adjustable radially of the disc as by having the ball carriage or race 20 thereof threaded on a threaded shaft 21. Said ball, in turn, drives a cylinder 22 at a speed proportional to the radial displacement of the ball which, in turn, is controlled by the shaft 21. The shaft 7 drives one element 23 of a differential gear train 24. The opposite element is shown as driven from a gear 25 on the shaft of the roller 22, and the third arm is connected to the shaft 21. Therefore the radial position of the ball on the disc 15 will always represent the rate of movement of the shaft 7 or, in other words, the rate of turning of the gun carriage in azimuth. Therefore the extent of rotation of the shaft 21, which positions the ball 19 radially, represents the angular rate of movement of the gun.

As explained above, for short ranges this angular rate, multiplied by a selected constant, may be used as an indication of the movement of the target that takes place during the time of flight of the shell, and therefore the rotation of the shaft 21 is transmitted through a suitable coupling 26 and flexible shaft 27 to displace the sight with respect to the gun so that the sight is set behind the gun through a proportional angle or, in other words, the gun set in advance of the sight, since it is the sight that is kept on the target by the gunner. As shown, the flexible shaft 27 rotates the worm 28 driving worm wheel 29 on the base of the sight to rotate the same on the gun. Similarly, the combination rate computing device comprising ball 19', cylinder 22', shaft 21', differential 24', etc., rotates the flexible shaft 27' to tilt the sight on the gun, as by means of a worm 28' and worm wheel 29'.

By this means, therefore, we have devised a very simple continuously and automatically actuated predictor for aiming the gun in azimuth and elevation at the predicted position that the target will be in at the time the shell reaches the same.

A slight modification of this arrangement is shown in Fig. 6. Fig. 1 is subject to a slight error owing to the fact that the axis of rotation of the sight, being perpendicular to the gun, is not vertical when the gun is inclined. This defect is overcome in Fig. 6 by mounting the sight on the rotatable standard 2 so that its azimuth axis does not tilt in elevation with the gun 1. According to this arrangement, the azimuth control of the sight remains as before, but in elevation the sight is actuated by the combined movements of the gun in elevation through the flexible shaft 75 and the rate correction elevation from the shaft 27', the two movements being combined through a differential 76 and transmitted to the sight through the flexible shaft 77. Said shaft is shown as rotating a worm 78 meshing with a worm sector 79 secured to the base 80 of the sight, the base being hinged at 81 to the platform 82, which is mounted on the worm gear 29' driven from worm 28.

Also, we may employ a similar mechanism in a complete fire control computer for long range guns of the anti-aircraft or other type, such as shown, for instance, in the prior patent of one of the joint inventors, Earl W. Chafee, and Hugh Murtagh and Shierfield G. Myers, No. 2,065,303, dated December 22, 1936, and also in the sole application of said Earl W. Chafee, Serial No. 65,125, filed February 21, 1936. According to said prior inventions, the movement of the target is resolved into rectilinear components and the rate of movement along each component measured by tachometers, the resultant values being set in the machine by hand in order to multiply the rate by the time of flight of the shell.

The present invention offers a simplification and improvement of said mechanism, as shown in Fig. 3. In this figure, a slide 31 represents one of the present position slides of the machine and slide 32 the corresponding future position slide. The movement of slide 31 is shown as actuating, through rack teeth 32' and pinion 33, a shaft 34 on which is mounted a pair of pinions 35 and 36. The former actuates one arm 37 of a differential gear train 38. The opposite arm 39 is turned from a pinion 40 on the shaft of a cylinder 42 of a variable speed gear, such as shown in Fig. 2. In this case the ball carriage 43 is shown as of the two ball integrator type, which is positioned radially of the disc 44 by means of rack bar 45, which carries the carriage for the balls and meshes with the pinion 46 on shaft 47. The disc 44 is shown as rotated from a constant speed motor 14'. The shaft 47 is driven from the third arm of the differential through a shaft 50 and bevel gearing 51, so that the rotational position of shaft 50 is proportional to the component rate of the target, i. e., along the X or Y axis in azimuth or the Z axis in elevation.

Said shaft is shown as actuating elongated pinion 52 to rotate the cam 53 through the pinion 54. Said cam may be of the three-dimensional type and is positioned axially with respect to the cam pin 55 in proportion to the time of flight of the shell by means not shown, but which may be similar to the means shown in the aforesaid prior applications. The cam is so laid out that the lift of the pin 55 represents the movement of the target that takes place during the time of flight of the shell, which movement is added to the present position of the target through the differential 56 to position the slide 32 to represent the component future position of the target.

A still further improvement is suggested in Fig. 4, wherein the multiplying cam 53 is eliminated. According to this figure, the present position slide is again shown at 31, which actuates the pinions 33 and 33'. The pinion 33 is shown as actuating, as before, a pinion 35 and one arm 37 of differential gear train 38. The variable speed mechanism 42—46 may remain as before, except that the disc 44, instead of being driven by a constant speed motor, is driven at a variable speed inversely proportional to the time of flight of the shell $$\left(\frac{1}{T}\right)$$

In order to obtain this quantity, we have shown a time of flight cam T which is positioned rotationally and axially by means (not shown) in proportion to horizontal range and altitude, the cam being so laid out that the lift of the pin 60 is proportional to $$\frac{1}{T}$$

In order to convert this into the corresponding velocity of rotation, we have shown said pin as radially positioning a two ball integrator 61 which drives a cylinder 62 from a constantly driven disc 63 driven by the motor 14'. Said cylinder drives the disc 44 through suitable gearing 64 at a rate proportional to $$\frac{1}{T}$$

Therefore the shaft 50' will be positioned in accordance with $$\frac{R}{\frac{1}{T}}$$

or, in other words, in accordance with RT, representing the predicted movement of the target during the time of flight of the shell. This quantity is added to the present position of the slide 31 through the differential 56' to position the future slide 32.

It should be noted that our design places virtually no load on slide 31, since the power for actuating the balance of the mechanism beyond differential 38 is supplied by power motor 14'.

In Fig. 5 the apparatus is similar and the parts are similarly numbered as in Fig. 4. In addition, however, there is a third variable speed mechanism shown at 65 for introducing wind correction, which in the prior art has been set into the rate measuring tachometers. In the present device, the wind correction device comprises a disc 65' constantly driven from a motor 14' through gearing 66. On said disc is positioned a two ball integrator 67 which is positioned radially from a hand wheel 68 in accordance with the component velocity of the wind as it affects the shell. This is converted into a rate by said mechanism so that the cylinder 62' is driven at a velocity proportional to the rate of deflection or retardation of the shell. This is added to the present position rate through a differential 69 and transmitted through the shaft 70 to the differential 38', whence the future position is calculated by the same mechanism as shown in Fig. 4. It should be noted in this case that the wind deflection rate is combined with the time of flight through device 44 as well as the target rate in one operation to give the total correction in the present position.

In our invention, therefore, we really improve the operation of predictors by making the same more completely automatic and capable of operating against high speed, close range targets. However, the particular mechanism of Figs. 3, 4, and 5 and especially the application of these figures to predictors is not claimed herein, the claims on this subject matter being reserved for a divisional or continuation application.

Our method of obtaining velocity or rate from movement may also be carried one or more steps further to obtain the higher time derivatives of motion, i. e., acceleration and rate of change of acceleration, etc. Fig. 7 illustrates how this may be carried out in mechanism similar to Fig. 3. In this case, the movements of the member 31 actuate, as before, one side 39 of a differential 38. The opposite side 37 is shown as turned from a roller 42' forming a part of a variable speed mechanism 44'. In this case, however, the laterally movable balls 43' are not actuated directly from the third arm of the differential 38, but there is interposed a second variable speed mechanism 90, the balls 91 of which are positioned radially on a disc 92 from said third arm of differential 38. The discs 44' and 90 are shown as driven from a common constant speed motor 14" and the balls 91 drive a cylinder 93, which positions radially the balls 43' on the disc 44'. In this case, the ball carriages 91 and 43' are shown as threaded on shaft 94 of differential 38 and the shaft 95 of cylinder 93, respectively. The shaft 96 of cylinder 42' may not only rotate one arm 37 of differential 38, but may also be used to actuate any mechanism requiring power to maintain it in positional agreement with 31. For this purpose there is shown a gear 97 thereon.

A consideration of the above mechanism will show that the position of the balls 43' will represent the velocity of movement of the slide 31, and the position of the balls 91 the acceleration of such slide. There is therefore shown actuated from shaft 95 a rate (v) indicator or tachometer 98, and as actuated from shaft 94, an acceleration (a) indicator 99. Such indications may be used for any purpose desired. If employed in a fire control system, they might be set in by hand or directly. If such mechanism were employed in the form of the invention shown in Fig. 3, the shaft 95', which turns the indicator 98, the position of which represents $v$, would be algebraically combined (in accordance with equation $v = v_1 + at$) with the position of shaft 94' (a) multiplied by the time of flight $t$ and the output would be employed to rotate the gear 52 of Fig. 3, the time multiplying mechanism shown therein not being repeated in Fig. 7. With this mechanism, more accurate results could be obtained against a target whose rate was changing at a more or less uniform rate, such as might occur in the case of diving targets.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a means for laying guns with reference to relatively movable targets, a variable speed device including a power driven member adapted to be driven at constant speed, an intermediate member adjustably positionable thereon and driven at a speed proportional to said adjustment, a third member actuated by said intermediate member, differential gearing, one arm of which is driven by the gun movements, a second arm by the third member movements and the third arm positioning said intermediate member relatively to said power driven member, and means positioned by the adjusted position of said intermediate member for altering the gun position with respect to the sight.

2. In a means for laying a gun with reference to a relatively movable target, which gun is mounted for rotation in azimuth and has a rotatable sight thereon, a variable speed device including a power driven member adapted to be driven at constant sped, an intermediate member adjustably positionable thereon to be driven at a speed proportional to said adjustment, a third member actuated thereby, differential gearing, one arm of which is driven by the gun movements, a second arm being driven by the movements of the third member movements and the third arm positioning said intermediate member, and means positioned by the adjusted position of said intermediate member for altering the angular relation between said sight and gun.

3. Means for relatively displacing the two elements, i. e., the sight and gun, of fire control apparatus, including a device for obtaining the higher derivatives of the motion of one of said elements with respect to time, a differential gear, means for turning one side thereof from one of said elements, a pair of power driven discs driven at constant speed, a radially adjustable ball member driven by each disc, a second arm of said differential positioning one of said ball members, an element driven by the last named ball member and positioning the other of said ball members, and an element driven by said other ball member for positioning the third arm of said differential, the radial position of said other ball member indicating velocity and the radial position of said first ball member indicating acceleration.

4. In a two part anti-aircraft fire control apparatus including a gun and a sight, means for relatively displacing the sight with respect to the gun, including a device for differentiating the motion of one of said parts with respect to time, differential gear means for turning one side thereof from one of said parts, a disc normally driven at a constant speed, a ball member radially adjustable on and driven by said disc at a speed proportional to the radial displacement of said ball member, the second arm of said differential positioning said ball member and displacing the relative positions of said sight and gun, and an element driven by said ball member connected to the third arm of said differential.

5. In a means for laying guns with reference to relatively movable targets in both azimuth and elevation, a pair of variable speed devices, one for azimuth and the other for elevation and each including a power driven member adapted to be driven at a constant speed, an intermediate member adjustably positioned thereon and driven at a speed proportional to said adjustment, a third member actuated by said intermediate member, differential gearing, one arm of which is driven by the angular movements of the gun, the second arm by the third member movements, and the third arm positioning said intermediate member relative to said power driven member, and means positioned by the adjusted position of each of said intermediate members for altering the gun position with respect to the sight in azimuth and elevation respectively.

EARL W. CHAFFEE.
BRUNO A. WITTKUHNS.